Nov. 24, 1936.  O. L. HERRON  2,062,177
VEHICLE ROOF
Filed May 24, 1933   2 Sheets-Sheet 2
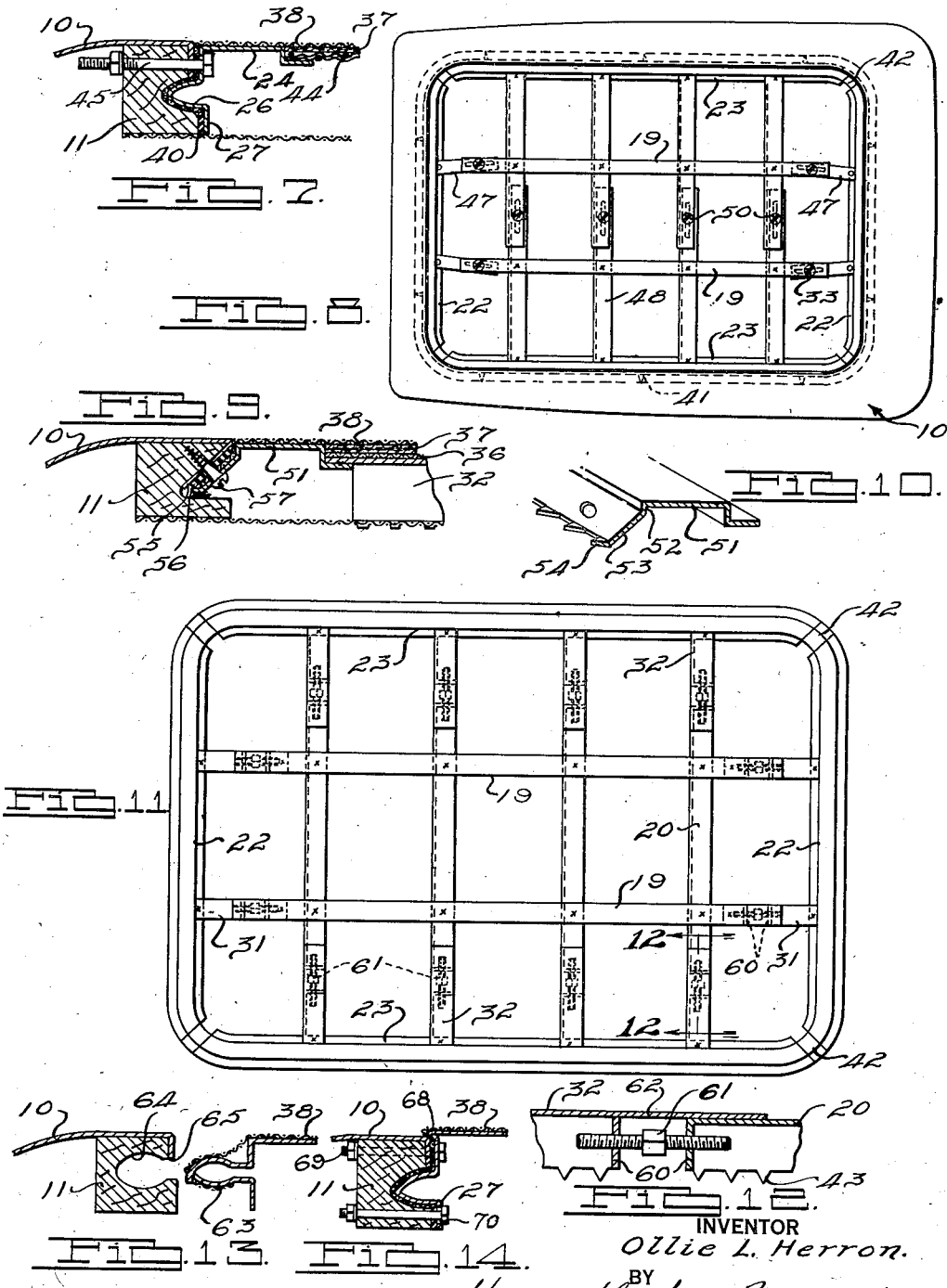
INVENTOR
Ollie L. Herron.
BY
Harness, Dickey, Pierce & Hann.
ATTORNEYS.

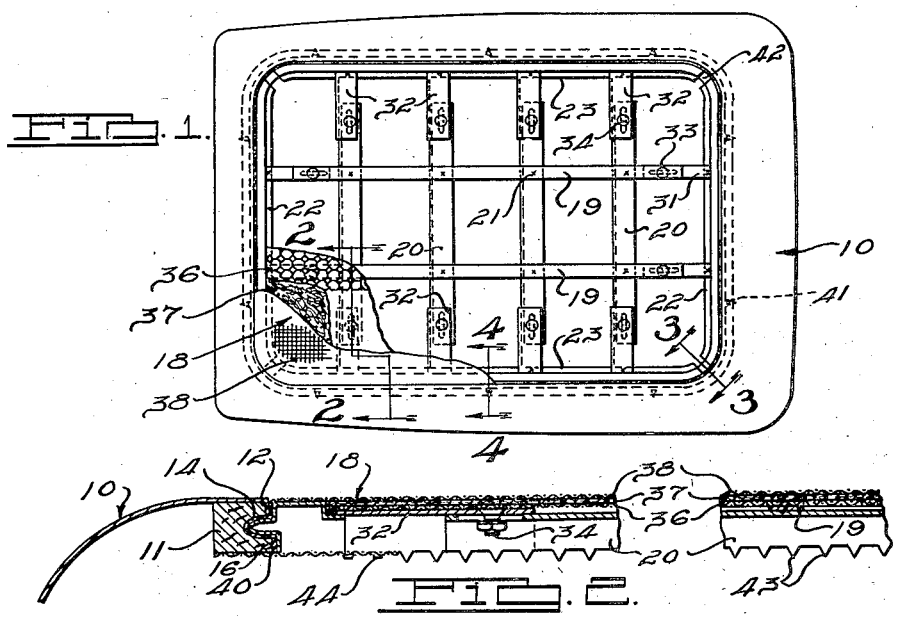

Patented Nov. 24, 1936

2,062,177

UNITED STATES PATENT OFFICE 2,062,177

VEHICLE ROOF

Ollie L. Herron, Chicago, Ill., assignor to Herron-Zimmers Moulding Co., a corporation of Illinois Application May 24, 1933, Serial No. 672,593

11 Claims. (Cl. 296—137)

The invention relates to motor vehicles and it has particular relation to a roof construction for automobile bodies.

At the present time it is conventional in the automobile body to have what is known as a quarter panel of sheet metal around the edge portions of the roof, and what is known as the roof proper, inserted within this quarter panel margin. Usually this roof comprises a wooden frame covered by waterproof fabric. Great difficulty has been encountered in roof constructions of this character, in providing a durable and satisfactory seal between the roof and the quarter panel and this difficulty has been accentuated by the fact that a close fit ordinarily cannot be obtained between edges of the roof and the panel owing to manufacturing tolerances required and variation in sizes. This situation has necessitated the use of considerable sealing material and usually a molding strip for covering the existing interstices. Experience has determined that in roof constructions of this character, the sealing means between the roof and panel is not as durable and as satisfactory as desired and frequently after a relatively short period of use, the roof leaks around its edges.

One object of the present invention is to provide a roof construction which may be expanded into engagement with the quarter panel construction previously mentioned, so as to substantially eliminate interstices between the roof and panel, and at the same time compensate for variations in dimensions of the panel and roof construction.

Another object of the invention is to provide an expansible roof construction for the above-mentioned purpose which can initially be assembled with the waterproof covering and then expanded into engagement with the quarter panel structure.

Another object of the invention is to provide an expansible roof construction in which the roof and the quarter panel are effectively locked together during expansion of the roof and maintained in locked relation by maintenance of the roof in its expanded condition.

Another object of the invention is to provide an expansible roof construction in which edge portions of the roof snap into interlocking relation with the quarter panel construction upon expansion of the roof.

Another object of the invention is to provide an expansible roof construction adapted to cooperate with a quarter panel structure, wherein the joints between the edges of the roof and the panel are efficiently and durably sealed to prevent leakage through the roof.

Other objects of the invention will become apparent from the following description, the drawings relating thereto and the claims hereinafter set forth.

For a better understanding of the invention reference may be had to the drawings, wherein:

Figure 1 is a plan view of a vehicle roof construction with the roof covering material partly removed so as to illustrate details of the construction more clearly, Fig. 2 is a cross-sectional view on a larger scale taken substantially along the line 2—2 of Fig. 1, Fig. 3 is a cross-sectional view on a larger scale taken substantially along the line 3—3 of Fig. 1, Fig. 4 is a cross-sectional view on a larger scale taken substantially along the line 4—4 of Fig. 1, Fig. 5 is a cross-sectional and perspective view of a part of the roof frame illustrating particularly the manner in which the waterproof covering is attached thereto, Fig. 6 is a plan view similar to Fig. 1 illustrating another form of the invention, Fig. 7 is a cross-sectional view on a larger scale taken substantially along the line 7—7 of Fig. 6, Fig. 8 is a plan view similar to Fig. 1 but illustrating still another form of the invention, Fig. 9 is a cross-sectional view similar to Figs. 3 and 4 and illustrating a different form of frame member for the roof and the manner in which this frame member cooperates with the quarter panel construction, Fig. 10 is a cross-sectional and perspective view illustrating the frame member shown by Fig. 9 as seen prior to application of the waterproof covering thereto, Fig. 11 is a plan view similar to Fig. 8 but illustrating still another form of the invention, Fig. 12 is a cross-sectional view on a larger scale taken substantially along the line 12—12 of Fig. 11, Fig. 13 is a cross-sectional view illustrating still another form of the invention, in which the roof cooperates with the quarter panel construction in a snap locking manner, Fig. 14 is a cross-sectional view illustrating another form of the invention in which the roof overlaps the quarter panel structure.

Referring to Figs. 1 to 4, a sheet metal quarter panel structure at the upper edge of the automobile body is indicated at 10 and, as shown particularly in Fig. 2, a wooden frame 11 extends around and under the inner edge of the panel. For securing the panel to the wooden frame, the inner edge portion of the former is flanged downwardly as indicated at 12 and the flanged portion is secured to the frame by nails or the like as indicated at 13 in Fig. 3. Ordinarily, the panel is generally rectangular in shape and the wooden frame comprises rectangularly arranged beams, each of which is generally rectangular in cross section. As particularly shown by Figs. 2 and 3, the inner and vertical sides of the wooden frame are formed with longitudinally and generally wedge-shaped recesses 14 which cooperate to provide an annular recess extending around this side of the frame. This recess is located intermediate upper and lower edges of the beams, thereby providing shoulders 15 and 16 above and below the recess. The flanged portion 12 of the panel 10 preferably extends downwardly over the shoulder 15 and may, if desired, be seated in a notched-out portion of such shoulder. It will be evident that the arrangement so far described leaves an opening around the inner edge of the panel and wooden frame which is adapted to receive a roof.

As shown by Fig. 1, the roof is indicated at 18 and includes a frame comprising longitudinally extending strip metal members 19 and transversely extending angle irons 20 which are connected as by spot welding indicated at 21. The frame also includes transversely extending end members 22 and longitudinally extending side members 23 which are arranged in polygonal and substantially rectangular form and are adapted to be substantially complementary to the respective sides of the opening for the roof. As best shown by Fig. 5, each of the frame members 22 and 23 comprises a sheet metal structure having an upper flat portion 24, a short downwardly projecting flange portion 25 at its outer edge, a substantially wedge-shaped, hollow portion 26 below the portion 25, and a flange portion 27 below the wedge-shaped portion. At longitudinally spaced points, the base of the wedge portion 26 has outwardly stamped prongs 28 which are utilized for securing a waterproof covering to the members 22 and 23 as will hereinafter more fully be explained. At the inner edge of the flat portion 24, a downwardly offset shoulder 29 is provided.

The shoulder on the end members 22 provides a support for short straps 31 which may be welded to the shoulder surface while the shoulder on the side members is similarly connected to short angle irons 32. It will be appreciated that the vertical leg of the angle irons may be cut away or turned into the plane of the horizontal leg so that the latter may rest on the shoulder. The straps 31 on the end members 22 are disposed in lapping relation to the ends of the strip members 19 and the overlapping parts are adjustably connected by bolts 33 that pass through elongated slots shown as provided in the straps 31. Similarly the angle irons 32 overlap the ends of the angle irons 20 and are adjustably secured thereto by bolts 34 passing through elongated slots shown as formed in the angle iron 20. From this description it will be apparent that by loosening the bolts, the end members 22 may be further separated longitudinally of the roof and the side members 23 may be further separated transversely of the roof.

Ordinarily in a roof opening such as described, the corners are rounded as shown in Fig. 1 and for this reason the ends of the members 22 and 23 are partially curved so that the adjacent ends at any corner may jointly be complementary to the curved corner of the roof opening. When the frame is assembled and before it is associated with the panel 10 and wooden frame 11, a wire screen 36 or the like may be disposed over the members 19 and 20 and secured at its edges to the shoulder portions 29 of the members 22 and 23 or, if preferred, the screen may extend over the flat portions 24 of such members. Again the screen need not be secured to such members but may only be disposed over the frame and extend over the flat portions 24 or the shoulders 29 of the members 22 and 23. This screen is utilized primarily to support cotton batting 37 ordinarily used in roof constructions. Over the cotton batting, a waterproof fabric covering 38 is applied and the edges of this covering as best shown by Fig. 5 extend over the edge portions of the members 22 and 23 and are fastened thereto by means of the prongs 28 that project through the covering and which are then bent over to hold the edges of the covering. It is apparent that the cover may be applied more or less loosely over the frame while the latter is in its contracted condition, that is, with the members 22 and 23 contracted to reduce the size of the frame. After assembling the waterproof covering, the roof is disposed within the opening therefor and then the members 22 and 23 may be expanded, which causes the wedge portions 26 of such members to enter the recesses 14 in the wooden frame 11. Preferably, before so inserting the roof, a rubber sealing strip 40 is disposed between the shoulders 16 of the wooden frame and the vertical flange portions 27 of the frame members 22 and 23 and upon expansion of the frame in the manner mentioned, the wedge portion 26 is forcefully seated in the recess 14 in the wooden frame and the flange 27 forcefully abuts the rubber sealing strip 40. When the roof is so expanded to obtain this interlocking and sealing arrangement, the bolts 33 and 34 may be tightened to hold the roof in its expanded position. It may be mentioned in this connection that the parts are so arranged that the flanged portion 25 and its covering of waterproof fabric substantially engage the adjacent portion of the wooden frame and flange 15 of the panel 10 so as to eliminate interstices at this point and at the same time provide a seal. It will be appreciated that the waterproof covering may if necessary be slightly stretched in expanding the roof and that during the expansion of the roof the edge portions of the fabric will conform to the upper part of the wedge portion 26 and the recess 14. After inserting the roof, in the manner mentioned, the portions 25 and 27 of the members 22 and 23 may be permanently secured, if found desirable, to the wooden frame by using screws, bolts or the like particularly as shown by Fig. 4 and as indicated at 41. Use of these screws or bolts further insures maintenance of a seal at the joint between the roof and the panel and also further insures elimination of any interstices at the joint.

After so disposing the roof in its proper position, rubber blocks as indicated at 42 in Fig. 3, and which correspond generally to the shape of the frame members 22 and 23 in cross section, may be inserted from the underside of the roof, into positions between adjacent ends of the members 22 and 23 at each corner. It is apparent that these blocks may be forcefully inserted, particularly due to the deformability of the rubber, so that finally openings at the corners of the frame between the members 22 and 23 are definitely eliminated.

After mounting the roof in place, the inner fabric covering for the automobile body may be fastened to the roof and preferably for fastening the covering thereto, the transverse members 20 have their vertical leg portions provided with prongs 43 at the lower edge thereof and attaching strips secured to the upper surface of the fabric covering may be hooked over such prongs and then the prongs bent into holding relation as particularly shown at 44 in Fig. 2. Usually in securing this inner lining to the roof, it is first fastened to one of the transverse members 20 either at the rear or the front and then progressively fastened to the others longitudinally of the roof. The edges of this fabric extend laterally beyond the wooden frame 11 and are fastened thereto or to adjacent parts of the body under the panel 10.

It will be appreciated from the foregoing description that the expansibility and adjustability of the frame and the roof longitudinally and transversely of the roof opening enables elimination of interstices in the roof surface along the quarter panel construction and hence eliminates the use of sealing material in the manner it is used at the present time. Furthermore, a positive seal is obtained by expanding the roof and this seal is maintained by securing the roof in its expanded position and additionally by using the screw or bolt fastening means securing the members 22 and 23 to the wooden frame 11. The wedge portions 26 cooperating with the recesses 14 in the wooden frame are desirable in locking the frame against vertical movement and at the same time providing an additional seal owing to the cooperation of the wedge portion with the recess during the expansion of the frame.

In the arrangement shown by Fig. 6, a screen 44 constructed of rather heavy wire is used in place of the frame members 20 and 19 and use of this screen may also render it unnecessary to use any screen such as indicated at 36 in Fig. 1 for supporting the cotton batting. As more particularly shown by Fig. 7, the transverse wires and longitudinal wires comprising the screen 44 are of undulating character so that the frame may be expanded transversely and longitudinally during which the undulating portions of the wire permit their effective elongation. For expanding the frame longitudinally and transversely after the cotton batting and waterproof covering have been associated therewith, bolts as indicated at 45 and which are adapted to cooperate with the flange portion 25 of the members 22 and 23, are used to draw the latter longitudinally and transversely respectively against the wooden frame 11. These bolts may be provided with nuts on their outer ends so that the members 22 and 23 may be expanded into sealing relation with the wooden frame. The inner lining fabric for the roof may be fastened to the wooden frame or sides of the automobile body in a manner previously mentioned and such lining may be secured to the roof by suitable fastening means depending from the wire screen 44 and which may be fastened to the lining.

In the construction shown by Fig. 8, which is similar to that shown by Fig. 1, short straps 47 are pivotally connected to the end members 22 but in other respects such legs 31 are as shown by Fig. 1. These legs have overlapping relation to the longitudinally extending metal strips 19 and are adjustably secured thereto as previously described by bolts 33. Oppositely disposed angle irons 48 are respectively secured to the members 23 and strips 19 by welding or the like and between the longitudinally extending strips 19, the angle irons overlap and are adjustably connected by bolts 50. It is apparent that the members 22 may be spread apart by adjustment of the bolts 50 and the angle irons 48. The pivotal connection between the straps 47 and the members 22 enables obtaining the transverse adjustment of the angle irons 48 without causing any binding action. The roof is associated with the body in the same manner as already described.

In the construction shown fragmentarily by Figs. 9 and 10, instead of using frame members 22 and 23 of the shape previously mentioned, frame members 51 are provided having a short shoulder 52 terminating in an inclined portion 53 which at its lower edge has prongs 54 for securing the waterproof fabric thereto. Also, in this construction, as shown by Fig. 9, the wooden frame 11 has a recess provided with a tapered surface 55 complementary to the portion 53 of the frame members 52. After the fabric covering is drawn over the frame and secured by bending over the prongs 54, the roof is inserted within the panel and then expanded to cause the tapered portions 53 to be brought against the tapered portions 55 of the wooden frame. For effecting a better seal between the parts, a rubber strip 56 initially may be disposed between the wooden frame and the tapered portions 53 of the members 51. It will be appreciated that the shoulder 52 facilitates closing of interstices between the panel and roof, particularly where the rubber strip 56 is employed.

It will be understood that the members 51 may be connected by any of the constructions shown by Figs. 1, 6 and 8 for obtaining expansive characteristics and that screws may be used as indicated at 57 for securing the members 51 to the wooden frame. As shown by Fig. 9, the members 51 are connected by transverse and longitudinal members such as shown by Figs. 1 and 8. In this construction, like the others, interstices along the joint between the panel, and the roof are eliminated and a positive seal is provided.

The roof frame shown by Fig. 11 is similar to that shown by Fig. 1 except that instead of using bolts and slots for expanding the frame and holding it in expanded position, the strips 19 and straps 31 have vertically disposed legs 60 which are connected as shown by Fig. 12, by a turn buckle screw 61 having its ends oppositely threaded. Thus by adjusting the turn buckle screws the frame members 22 may be expanded as previously set forth. The angle irons 20 and 32 similarly are provided with vertically depending flanges at their ends and these are connected by turn buckle screws. In this construction, however, and as shown by Fig. 12, one of the parts and as shown the angle iron 20, has a leg portion 62 that extends over the horizontal portion of the angle iron 32 so as to provide a more rigid assembly although one which is adjustable.

In the construction shown by Fig. 13, the arrangement is similar to that shown by Figs. 1 to 4 inclusive, excepting that the portion 26 is somewhat egg-shaped as indicated at 63 and the recess in the wooden frame as indicated at 64 is similarly shaped but is provided with a restricted opening 65. Owing to the resiliency of the sheet metal, it is apparent that when the frame is laterally and longitudinally expanded, the egg shaped bead 63 will be forced into the opening 64 through the entry 65 and then will snap into the opening 64. In other words, a snap action lock is obtained which will in certain respects be desirable for maintaining the roof and panel closely drawn together.

In the construction shown by Fig. 14, which is similar to that shown in Figs. 1 to 4, the members 22 and 23 have upper corner portions 68 that overlap the edge of the quarter panel. This is advantageous in definitely securing a positive seal at the upper edge of the panel and at the same time positively eliminating any vertical crevice between the panel and roof. Also, the members 22 and 23 are adjustably secured to the wooden frame 11 by bolts 69 and it is evident that these bolts may be used in expanding or adjusting the roof. As shown at 70, the members 22 and 23 may have elongated openings, so that no difficulty will be encountered in having aligned openings in the members and wooden frame with the roof in proper position.

The bolt fastening means 69 may be used for adjusting and expanding as well as holding the roof in any of the structures illustrated and manifestly may be used in place of the screws shown by Fig. 4.

In all of the constructions illustrated, it is apparent that a roof is provided which may be expanded into engaging relation with the wooden frame and quarter panel construction of the body so as to eliminate interstices along the edge of the roof and between it and the quarter panel. This in turn eliminates the use of sealing material that ordinarily is applied in the interstices in the conventional roof construction. Additionally, it is apparent that by expanding the roof, a tight and sealing connection between it and the edges of the wooden frame and quarter panel may be obtained which will prevent leakage. While the use of rubber or other sealing material between the edges of the roof and the wooden frame is desirable, it should be understood that the closeness of the fit ordinarily would be sufficient to prevent leakage along the joint. Additionally, it is apparent that the roof may be completely assembled with the cotton batting and waterproof covering and then inserted in the roof opening and expanded by adjusting the frame from its under side and this is extremely advantageous not only from the point of view of manufacturing the roof, but from the point of view of assembling it with the body thereafter. Moreover, it is apparent that by providing the expansible roof as illustrated, the roof of the automobile will be improved in appearance as the usual and relatively wide interstices existing and which are usually filled with sealing material, are eliminated along the joint between the roof and the quarter panel construction. Numerous other advantages of the construction will become manifest in the use of the invention.

While more than one form of the invention has been illustrated and described in detail, it will be apparent to those skilled in the art that various modifications may be made without departing from the scope of the appended claims.

What I claim is:

1. The combination with a vehicle body having a roof opening, of a roof comprising a frame adapted to be disposed in the opening and an expansible waterproof covering for the frame, means rendering said roof expansible in its own plane to enable obtaining a close fit of the latter with the sides of the opening, and cooperating snap locking means on the roof and body for locking the roof in place upon expansion of the latter.

2. The combination with a vehicle body having a roof opening, of a roof frame adapted to be disposed in the opening and comprising a plurality of frame members arranged around the sides of the opening to define a frame structure generally corresponding to the shape of the opening, means permitting the frame members respectively to move towards the sides of the opening contiguous therewith, a waterproof covering for the frame and having its edges secured to the edges of the latter, and means for positively drawing the frame members into closely fitting relation with the sides of the opening so as to substantially eliminate interstices between the roof and opening and simultaneously tightening the cover on the frame.

3. The combination with a vehicle body having a roof opening, of a roof frame adapted to be disposed in the opening and comprising a plurality of frame members arranged around the sides of the opening to define a frame structure generally corresponding to the shape of the opening, means permitting the frame members respectively to move towards the sides of the opening contiguous therewith, a waterproof covering for the frame and having its edges secured to the edges of the latter, means for positively drawing the frame members into closely fitting relation with the sides of the opening so as to substantially eliminate interstices between the roof and opening and simultaneously tightening the cover on the frame, and means for substantially providing a continuity of the frame periphery at the junctions of the frame members.

4. The combination with a vehicle body having a roof opening, of means on the body around the sides of the opening and providing a recess for receiving the edge of a roof frame, a roof frame adapted to be disposed in the opening and comprising a plurality of frame members arranged around the sides of the opening to define a frame structure generally corresponding to the shape of the opening, means permitting the frame members respectively to move towards the sides of the opening contiguous therewith, a waterproof covering for the frame and having its edges secured to the edges of the latter, and means for positively drawing the frame members into closely fitting relation with said recess along the sides of the opening so as to substantially eliminate interstices between the roof and opening and simultaneously tightening the cover and drawing its edges into closely fitting relation to the sides of the opening.

5. The combination with a vehicle body having a roof opening, of means on the body around the sides of the opening and providing a recess for receiving the edge of a roof frame, a roof frame adapted to be disposed in the opening and comprising a plurality of frame members arranged around the sides of the opening to define a frame structure generally corresponding to the shape of the opening, means permitting the frame members respectively to move towards the sides of the opening contiguous therewith, a waterproof covering for the frame and having its edges turned downwardly over the outer sides of the frame members and secured thereto, and means for positively drawing the frame members into closely fitting relation with said recess along the sides of the opening and simultaneously tightening the cover and drawing its edges into closely fitting relation with the sides of the opening, so as to substantially eliminate interstices along the edges of the opening.

6. The method of assembling an automobile roof structure and body having an opening for the roof structure, which comprises placing the roof structure in the opening and then expanding the structure in a generally horizontal plane to form a tight joint between the edges of the roof structure and the sides of the opening.

7. The method of assembling an automobile roof structure having a waterproof covering with a body having an opening for the structure, which comprises inserting the structure in the opening, and then expanding the structure in a generally horizontal plane to form a tight joint between the edges of the roof structure and the sides of the opening and to simultaneously tighten the covering on the roof structure.

8. The method of assembling an automobile roof structure and an automobile body having an opening for receiving the structure, which comprises providing mating dovetail portions along the edges of the opening and structure respectively, applying a waterproof covering over the structure and securing its edges thereto in overlapping relation to the dovetail portions on the edges of the structure, and then expanding the structure in a generally horizontal plane to form a tight and smooth joint between the dovetail portions and to simultaneously tighten the covering on the structure.

9. The combination with a vehicle body having a roof opening, of a roof frame adapted to be disposed in the opening and comprising a plurality of frame members arranged around the sides of the opening to define a frame structure generally corresponding to the shape of the opening, means permitting the frame members respectively to move towards the sides of the opening contiguous therewith, a waterproof covering for the frame and having its edges turned downwardly and secured to the edges of the frame, means interconnecting the frame members to provide substantial rigidity to the frame against deformation from its own plane but permitting the frame members to move towards the sides of the opening contiguous therewith, and means for positively drawing the frame members into closely fitting relation with the sides of the opening so as to substantially eliminate interstices between the edges of the frame and cover and the opening and to simultaneously tighten the cover on the frame.

10. The combination with a vehicle body having a roof opening, of a roof frame adapted to be disposed in the opening and comprising a plurality of frame members arranged around the sides of the opening to define a frame structure generally corresponding to the shape of the opening, means permitting the frame members respectively to move towards the sides of the opening contiguous therewith, a waterproof covering for the frame and having its edges turned downwardly and secured to the edges of the frame, means interconnecting the frame members to provide substantial rigidity to the frame against deformation from its own plane but permitting the frame members to move towards the sides of the opening contiguous therewith, and means for positively drawing the frame members into closely fitting relation with the sides of the opening so as to substantially eliminate interstices between the edges of the frame and cover and the opening and to simultaneously tighten the cover on the frame, said interconnecting means including transversely extending and expansible bow members connecting opposed frame members.

11. The combination with a vehicle body having a roof opening, of a roof frame adapted to be disposed in the opening and comprising a plurality of frame members arranged around the sides of the opening to define a frame structure generally corresponding to the shape of the opening, means permitting the frame members respectively to move towards the sides of the opening contiguous therewith, a waterproof covering for the frame and having its edges turned downwardly and secured to the edges of the frame, means interconnecting the frame members to provide substantial rigidity to the frame against deformation from its own plane but permitting the frame members to move towards the sides of the opening contiguous therewith, and means for positively drawing the frame members into closely fitting relation with the sides of the opening so as to substantially eliminate interstices between the edges of the frame and cover and the opening and to simultaneously tighten the cover on the frame, said frame members having rounded corner portions to provide rounded corners for the roof.

OLLIE L. HERRON.